US012801913B2

(12) United States Patent
Mizoguchi et al.

(10) Patent No.: US 12,801,913 B2
(45) Date of Patent: Nov. 17, 2026

(54) MODEL ESTIMATION FOR SIGNAL TRANSMISSION QUALITY DETERMINATION

(71) Applicant: NEC Laboratories America, Inc., Princeton, NJ (US)

(72) Inventors: Takehiko Mizoguchi, Princeton, NJ (US); Liang Tong, Lawrenceville, NJ (US); Wei Cheng, Princeton Junction, NJ (US); Haifeng Chen, West Windsor, NJ (US)

(73) Assignee: NEC Corporation, Tokyo (JP)

(*) Notice: Subject to any disclaimer, the term of this patent is extended or adjusted under 35 U.S.C. 154(b) by 1032 days.

(21) Appl. No.: 17/969,349

(22) Filed: Oct. 19, 2022

(65) Prior Publication Data

US 2023/0130188 A1 Apr. 27, 2023

Related U.S. Application Data

(60) Provisional application No. 63/270,625, filed on Oct. 22, 2021.

(51) Int. Cl.

| | |
|---|---|
| ***G06N 3/08*** | (2023.01) |
| ***G06N 3/0442*** | (2023.01) |
| ***G06N 3/0455*** | (2023.01) |
| ***G06N 3/0499*** | (2023.01) |
| ***G06N 3/084*** | (2023.01) |
| ***G06N 3/088*** | (2023.01) |
| ***G06N 3/09*** | (2023.01) |

(52) U.S. Cl.
CPC .................................... *G06N 3/08* (2013.01)

(58) Field of Classification Search
CPC ........ G06N 3/08; G06N 3/088; G06N 3/0442; G06N 3/0499; G06N 3/0455; G06N 3/084; G06N 3/09
See application file for complete search history.

(56) References Cited

U.S. PATENT DOCUMENTS

| | | | | |
|---|---|---|---|---|
| 2019/0244108 | A1* | 8/2019 | Meyerson | G06N 3/044 |
| 2020/0018815 | A1* | 1/2020 | O'Shea | G01S 5/0215 |
| 2023/0409963 | A1* | 12/2023 | Narayanan Thangaraj | G06N 3/084 |
| 2024/0338572 | A1* | 10/2024 | Gillian | G06N 3/0895 |

OTHER PUBLICATIONS

Wan, Ziyu, Dongdong Chen, and Jing Liao. "Visual structure constraint for transductive zero-shot learning in the wild." International Journal of Computer Vision 129.6 (2021): 1893-1909. (Year: 2021).*

(Continued)

*Primary Examiner* — Usmaan Saeed
*Assistant Examiner* — Hyungjun B Yi
(74) *Attorney, Agent, or Firm* — Vincent Duffy

(57) ABSTRACT

Methods and systems for training a model include collecting unlabeled training data during operation of a device. A model is adapted to operational conditions of the device using the unlabeled training data. The model includes a shared encoder that is trained on labeled training data from multiple devices and further includes a device-specific decoder that is trained on labeled training data corresponding to the device.

10 Claims, 10 Drawing Sheets

(56) References Cited

OTHER PUBLICATIONS

Xie, S., Zheng, Z., Chen, L., & Chen, C. (Jul. 2018). Learning semantic representations for unsupervised domain adaptation. In International conference on machine learning (pp. 5423-5432). PMLR. (Year: 2018).*

Deng, Z., Luo, Y., & Zhu, J. (2019). Cluster alignment with a teacher for unsupervised domain adaptation. In Proceedings of the IEEE/CVF international conference on computer vision (pp. 9944-9953). (Year: 2019).*

Rottondi, C., Di Marino, R., Nava, M., Giusti, A., & Bianco, A. (2020). On the benefits of domain adaptation techniques for quality of transmission estimation in optical networks. Journal of Optical Communications and Networking, 13(1), A34-A43. (Year: 2020).*

Freire, P. J., Abode, D., Prilepsky, J. E., Costa, N., Spinnler, B., Napoli, A., & Turitsyn, S. K. (2021). Transfer learning for neural networks-based equalizers in coherent optical systems. Journal of Lightwave Technology, 39(21), 6733-6745. (Year: 2021).*

Liong et al., "Deep hashing for compact binary codes learning," in Proc. IEEE Conf. Computer Vision and Pattern Recognition (CVPR), Jun. 2015, pp. 2475-2483.

Lai et al., "Simultaneous feature learning and hash coding with deep neural networks," in Proc. IEEE Conference on Computer Vision and Pattern Recognition (CVPR), Jun. 2015, pp. 3270-3278.

* cited by examiner

MODEL ESTIMATION FOR SIGNAL TRANSMISSION QUALITY DETERMINATION

RELATED APPLICATION INFORMATION

This application claims priority to U.S. patent application No. 63/270,625, filed on Oct. 22, 2021, incorporated herein by reference in its entirety.

BACKGROUND

Technical Field

The present invention relates to network devices, and, more particularly, to determining signal transmission quality for optical network devices.

Description of the Related Art

Optical network devices transmit signals using light signals, which may be transmitted over optical fibers. During transmission, various effects can cause degradation of signal quality between a transmitter and a receiver. The transceiver and receiver can take steps to mitigate this degradation if an accurate estimate of transmission quality is available.

SUMMARY

A method of training a model includes collecting unlabeled training data during operation of a device. A model is adapted to operational conditions of the device using the unlabeled training data. The model includes a shared encoder that is trained on labeled training data from a plurality of devices and further includes a device-specific decoder that is trained on labeled training data corresponding to the device.

A communications system includes a transceiver configured to collect unlabeled training data during operation, a hardware processor, and memory configured to store program code. When executed by the hardware processor, the program code causes the hardware processor to adapt a model to operational conditions of the transceiver using the unlabeled training data. The model includes a shared encoder that is trained on labeled training data from a plurality of devices and further includes a device-specific decoder that is trained on labeled training data corresponding to the device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Estimating signal transmission quality of optical network devices from transmitted signals can help to improve the operation of optical network systems. Estimation of the quality may be formulated as a classification problem that assigns quality labels to input time series data segments that represent the transmitted signals.

To that end, ground truth class labels can be used to train the classifier, but this labeled training data is obtained from experimental environments that may not reflect the actual conditions that will be experienced during deployment. The signals may further have diverse characteristics according to the condition of the optical network, for example being affected by transceiver equipment, light power, signal modulation format, and network topology. A classifier trained on data from an experimental network may therefore not generalize to being applicable to practical network deployment.

A classifier may therefore be trained in a first meta-training step using the relatively abundant labeled data that is available from diverse experimental scenarios, and may further be trained using a relatively small amount of labeled data that corresponds to a particular type of hardware. After deployment, further training may be performed in an unsupervised fashion using unlabeled data that is collected at the deployed device, which can be used to adapt the pre-trained model to the current circumstances that the device is experiencing. The classifier can be used to estimate signal quality of optical network devices, and that signal quality estimate may, in turn, be used to improve the signal quality.

The classifier may use k-nearest neighbor classification and metric learning to learn low-dimensional embeddings of raw time series data segments while preserving a relative distance relationship. Meta-leaning performs meta-training of an optimal initial condition that can be quickly adapted to a target domain during operation, using datasets from target domains in experimental environments under various conditions. Adaptation then adapts the meta-trained model to a target domain using a limited number of labeled samples and a large number of unlabeled samples from the target domain.

Meta-leaning may incorporate modular network with dynamic routing (MNDR) to capture common knowledge across the different source domains. Adaptation may adapt the meta-trained model based on a supervised metric learning loss on the labeled samples of the target domain, an unsupervised metric learning loss on abundant unlabeled samples, and a discrepancy loss between class centers of labeled and classes and cluster centroids of unlabeled samples. These loss functions may be minimized over a set of model parameters to update those parameters.

Figure 1:
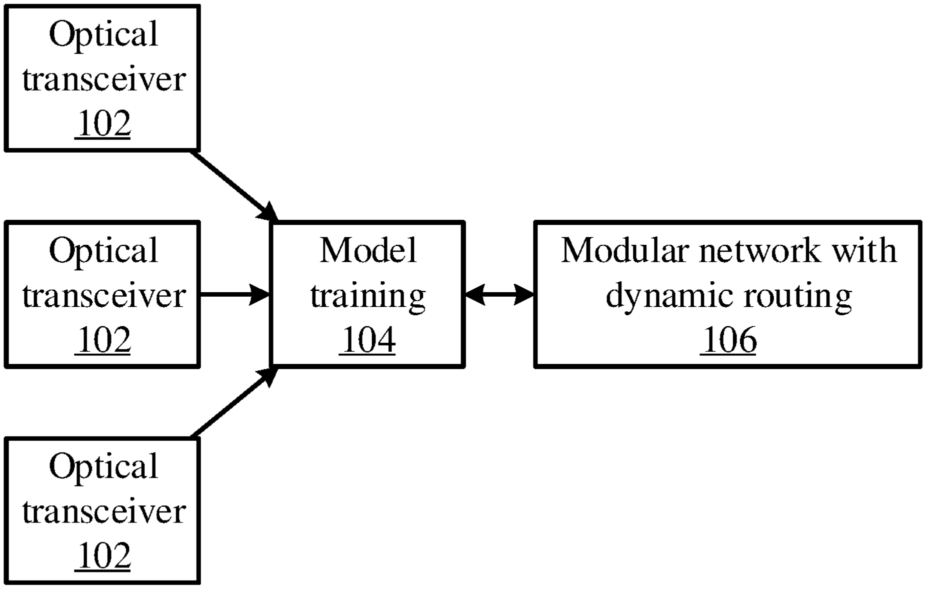
FIG. 1 is a block diagram of a system that trains a modular network with dynamic routing (MNDR) based on a set of optical transceivers, in accordance with an embodiment of the present invention.

Referring now to FIG. 1, a diagram of model meta-leaning is shown. A set of experimental optical transceivers 102 each generate respective measured signal outputs, with each signal output being labeled according to a set of measured channel conditions. The measured channel conditions represent the signal quality and may include, e.g., signal-to-noise ratio, signal bandwidth, non-linear noise, and any other appropriate signal quality metric.

This labeled training data is supplied to the model meta-trainer 104. Model training 104 is thereby used to train an MNDR classifier model 106. During training, the MNDR model 106 is used to predict the signal quality of a given element of the training data. The model meta-trainer 104 reviews classification outputs of the MNDR model 106 and uses a loss function to adjust weights of the MNDR model 106 to improve its accuracy.

Each of the optical transceivers 102 may be configured differently. For example, each may use a different combination of transceiver hardware, signal modulation scheme, transmission medium, network topology, and other characteristics to represent a different potential deployment environment. The optical transceivers 102 may generate the training data as respective time series data.

Figure 2:
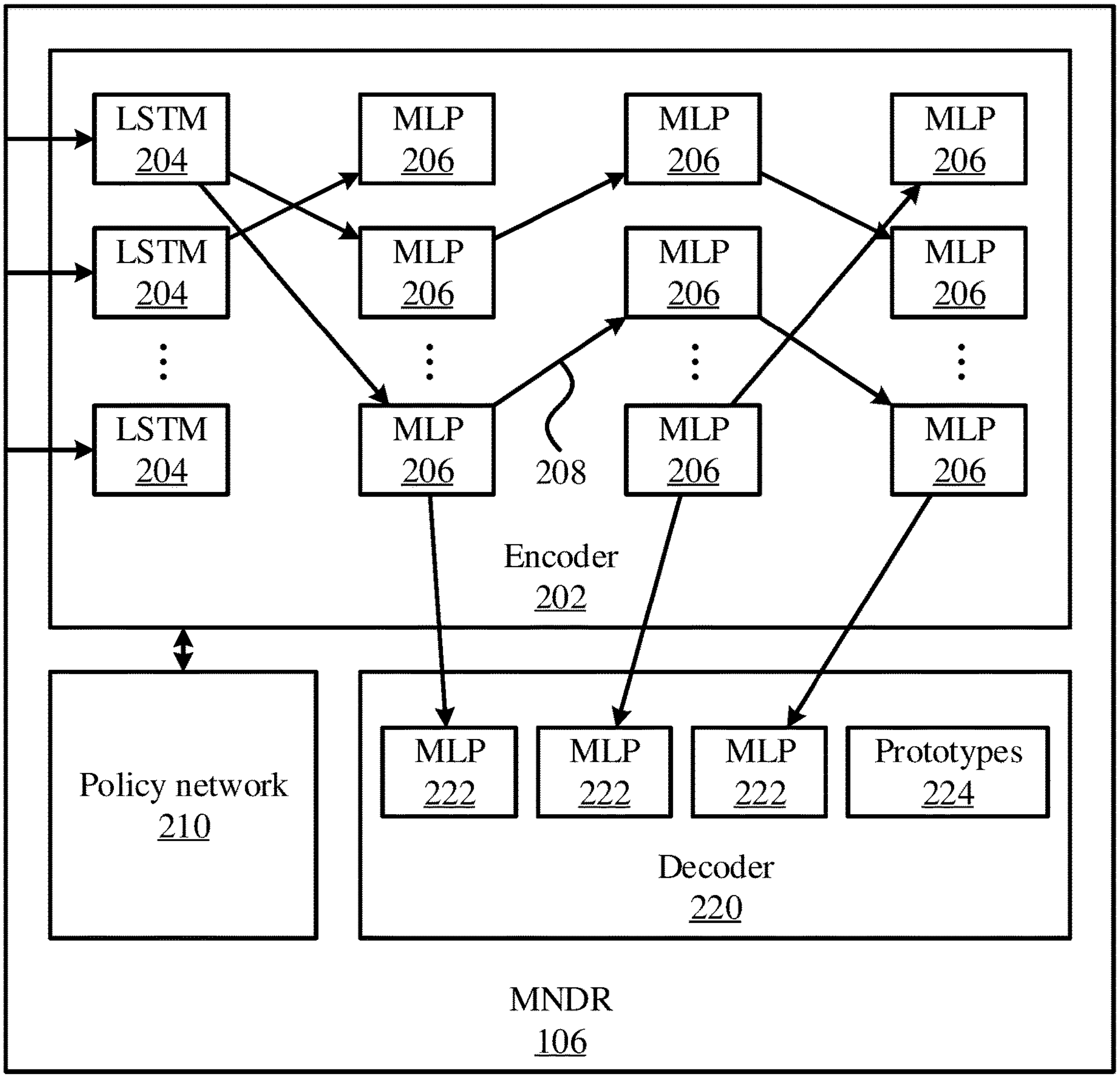
FIG. 2 is a block diagram of an MNDR model that includes a shared encoder and a device-specific decoder, in accordance with an embodiment of the present invention.

Referring now to FIG. 2, additional detail on the MNDR model 106 is shown. An encoder 202 receives a time series input, for example from a model trainer 104 or from an optical transceiver during operation. The encoder 202 may include a neural network, for example with an initial set of long-short term memory (LSTM) cells 204, followed by multiple sets of multilayer perceptrons (MLPs) 206. A policy network 210 controls the connections 208 between the LSTM cells 204 and the MLPs 206. Each LSTM cell 204 may receive a different time step from the input time series.

The LSTM cells 204 and the MLPs 206 are each trained to provide classification outputs that may vary according to how the different components of the encoder 202 are connected to one another. In this manner, a single trained encoder 202 may be quickly reconfigured in accordance with different conditions, such as selecting a particular arrangement of connections 208 for specific types of transceiver hardware. The policy network 210 may be trained jointly with the other network parameters in the MNDR model 106.

The MNDR model 106 may include multiple decoders 220, with each selectively activating parts of the shared encoder 202. Each decoder 220 may have a set of MLPs 222 that receive outputs from the encoder 202 The selection of decoders 220 can work alongside the policy network 210 to customize the operation of the MNDR model 106 according to the conditions in the optical network. The output of the active decoder 220 may be a low-dimensional representation of the input. These embeddings may be evaluated during training by using a loss function, and parameters of the LSTM cells 204 and the MLPs 206 may be updated accordingly.

During adaptation, a new optical transceiver may generate time series data with conditions that do not reflect the training data used for meta-training. There may be a relatively limited amount of training data available from the new optical transceiver. After the MNDR model 106 has been meta-trained, a randomly initialized new decoder 220 may be trained and a trainable cluster centroid, also known as a prototype 224, may be output. The MNDR model 106 may be trained for the new optical transceiver using a metric learning loss and a prototype loss.

After deployment, the MNDR model 106 may further be adapted after deployment to the particular hardware and conditions that it experiences during operation. The inputs at this stage may not be labeled, and so unlabeled inputs may be used for further unsupervised training. The same decoder 220 may be used as was created during the meta-testing phase, to match the hardware that the model has been deployed to. Adaptation may generate embeddings of the labeled training data, embeddings of the new, unlabeled data, and trainable prototypes. This process may use the supervised metric learning loss, an unsupervised metric learning loss, a prototype loss, and a discrepancy loss.

Figure 3:
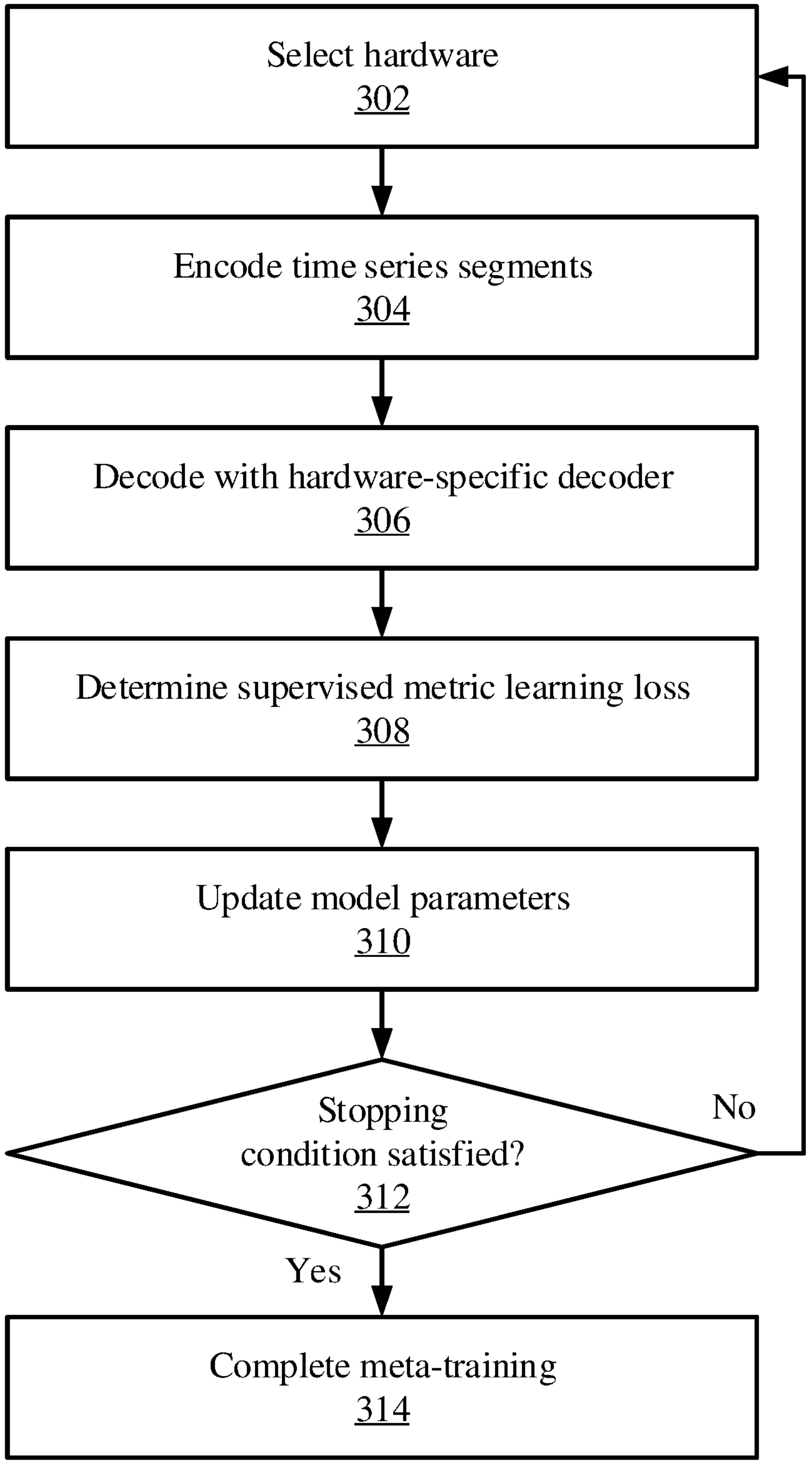
FIG. 3 is a block/flow diagram of a method for meta-training an MNDR model to train a shared encoder, in accordance with an embodiment of the present invention.

Referring now to FIG. 3, a method for performing meta-training is shown. Block 302 selects a particular data source, which may include a specific hardware transceiver that has known properties and associated labeled time series data, with the labels providing information related to signal quality. Block 304 encodes the time series segments using the encoder 202 of the MNDR model 106 to generate latent representations of the time series data. Block 306 then decodes the latent representation using a decoder 220 that corresponds to the particular data source.

Block 308 compares the decoded latent representation to the labels provided with the training data, using a supervised metric learning loss to evaluate discrepancies. Block 310 uses the calculated loss to update parameters of the MNDR model 106, which may update neural network weights in the encoder 202, the policy network 210, and/or the decoder 220. Updating the parameters may be performed using a stochastic gradient descent to reduce the loss.

Block 312 determines whether a stopping condition is satisfied. For example, if all of the training data from all of the data sources has been used for training, then block 314 may complete the meta-training. If block 312 determines that the stopping condition has not been satisfied, then processing may return to block 302 to select a new data source. Exemplary stopping conditions may include, e.g., reaching a maximum number of training epochs or reaching a predetermined lower threshold for the value of the training loss function.

For example, the supervised metric learning loss may be implemented as a triplet loss:

$$\ell_{triplet} = \sum_{(a,p,n)} (s_{ap} - s_{an} + a)_+$$

where $(\cdot)_+ := \max(0,\cdot)$, $s_{aq} := \|f_a - f_a\| (q \in \{p, n\})$ and $f_a$, $f_p$, and $f_n$ are features extracted by the MNDR model 106 relative from an anchor (a), positive (p), and negative (n) input segment. Anchor segments may be randomly selected from all data segments, positive segments may be randomly selected from data segments which belong to the same classes as anchors, and negative segments are randomly selected from data segments which belong to different classes from anchors. All anchor, positive, and negative samples may come from the data source selected in block 302.

Figure 4:
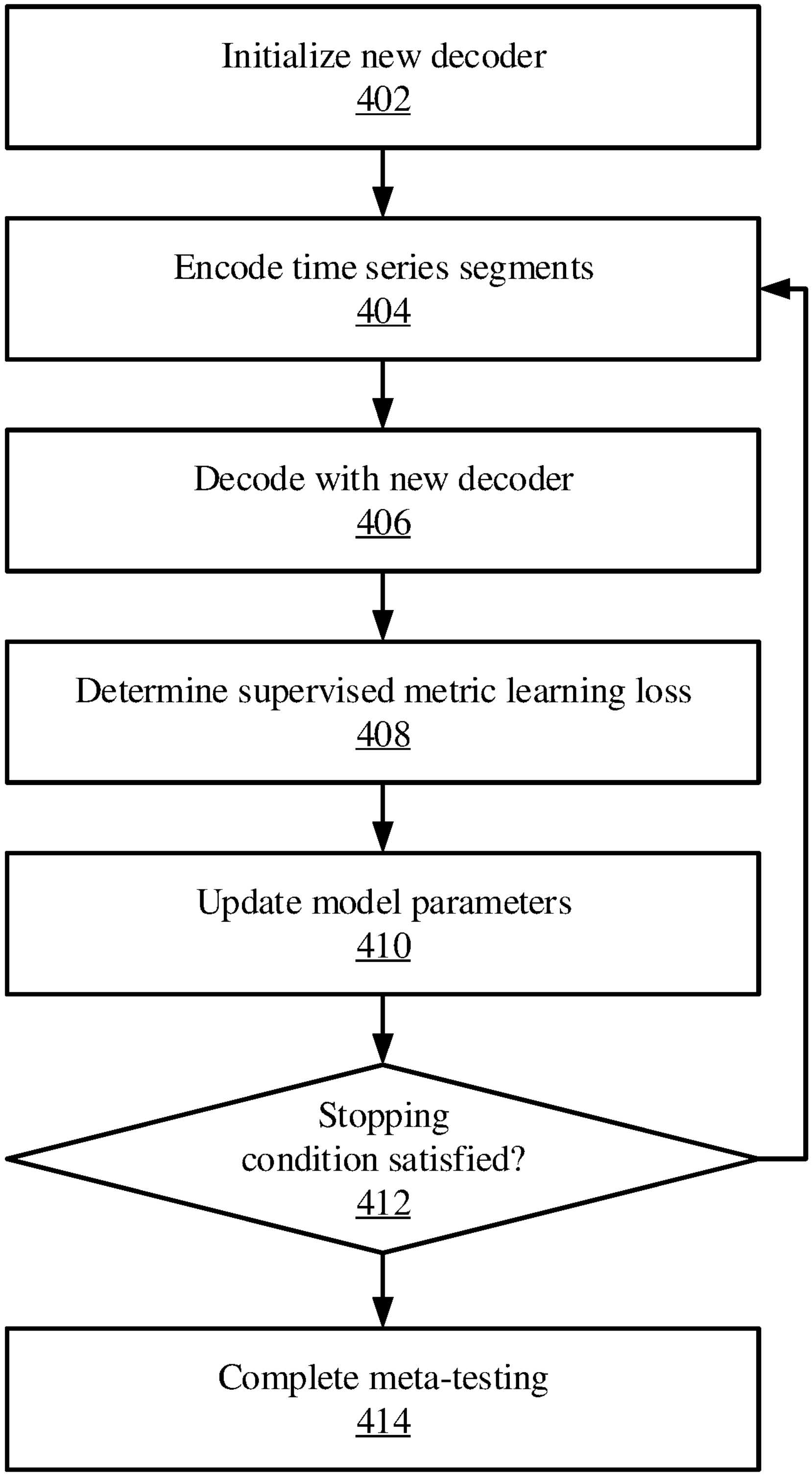
FIG. 4 is a block/flow diagram of a method for meta-testing an MNDR model to generate a device-specific decoder, in accordance with an embodiment of the present invention.

Referring now to FIG. 4, a method for performing meta-testing to build a new decoder for a new type of data source, such as a new type of transceiver hardware. Block 402 initializes a new decoder 220, for example using random parameter values. Time series segments, gathered from the new type of data source and provided with labels, are encoded at block 404 using the encoder 202 from the meta-training. The latent representation is then decoded in block 406 using the new decoder 220.

Block 408 compares the decoded latent representation to the labels provided with the training data, using the supervised metric learning loss to evaluate discrepancies. Block 410 uses the calculated loss to update parameters of the MNDR model 106, which may update neural network weights in the encoder 202, the policy network 210, and/or the decoder 220. Updating the parameters may be performed using a stochastic gradient descent to reduce the loss.

Block 412 determines whether a stopping condition is satisfied. For example, if all of the training data from the new data source has been used for training, then block 414 may complete the meta-testing. If block 412 determines that the stopping condition has not been satisfied, then processing may return to block 404 to encode a next time series segment. Exemplary stopping conditions may include, e.g., reaching a maximum number of training epochs or reaching a predetermined lower threshold for the value of the training loss function.

The loss function of block 408 may make use of the same loss $\ell$ triplet as is used during meta-training, but an additional prototype loss may be used. The prototype loss may include the following criteria:

A Kullback-Leibler (KL) loss may be expressed as $\Sigma_{a,p,n}(KL(s_a\|s_p)-KL(s_a\|s_n)+a)_+$, where KL(p‖q) represents the KL divergence between the probabilistic distributions p and q and where $$s_q = \frac{(1+\|f_q - p\|^2)^{-1}}{\sum_j (1+\|f_q - p_j\|^2)^{-1}} \in [0, 1]^K (q \in \{a, p, n\})$$

is the soft cluster assignments that represent the probability of belonging to clusters for feature $f_q$ based on the distance between prototypes and $f_q$. The value j={1, . . . , K} is an index of the prototypes and K is the number of prototypes.

Evidence regularization may be expressed as $$\sum_i \min_k \|f_i - p_k\|,$$

clustering regularization may be expressed as $$\sum_k \min_i \|p_k - f_i\|,$$

and diversity regularization may be expressed as $\Sigma_{k<l}(d_{min}-\|p_k-p_l\|)_+$.

Figure 5:
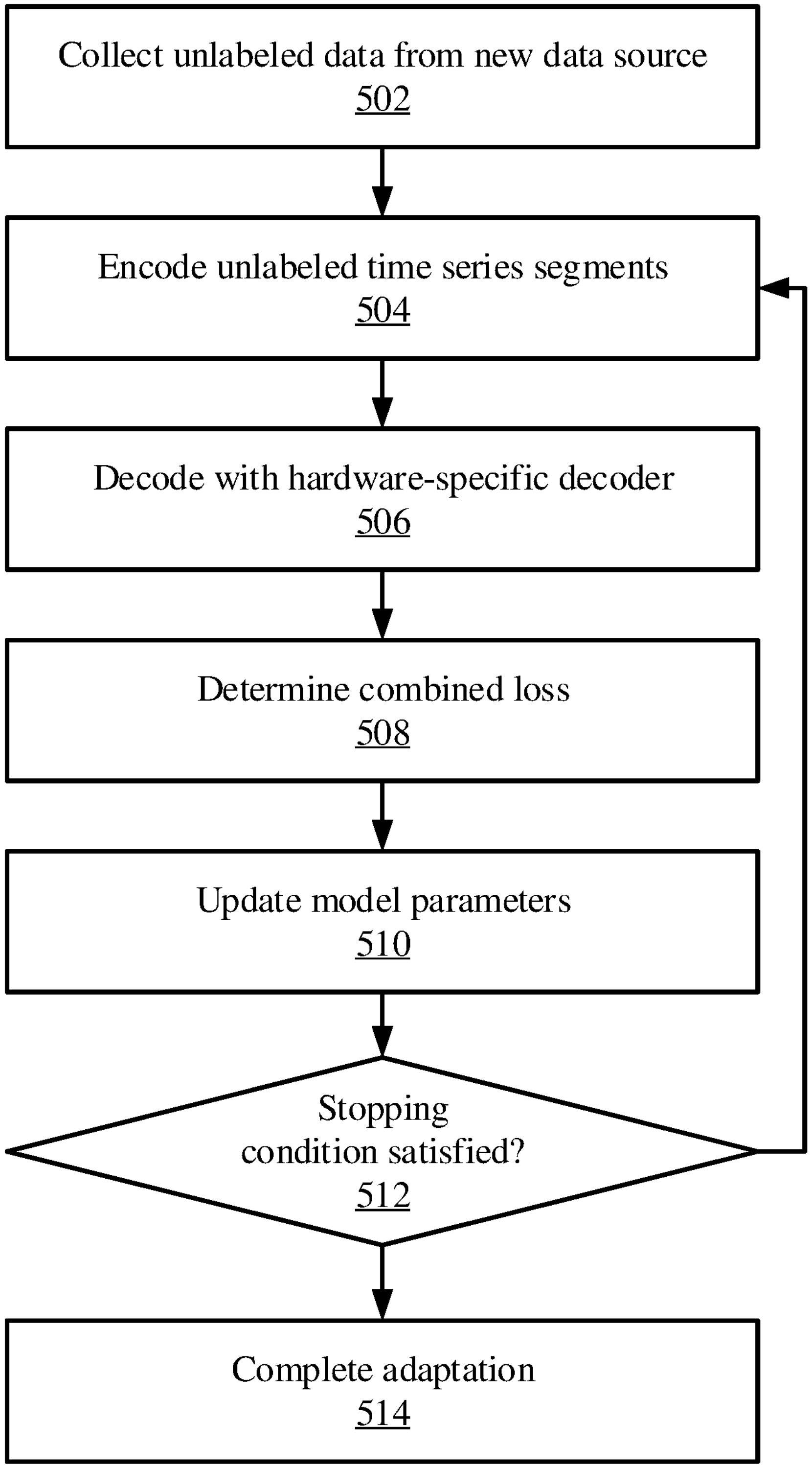
FIG. 5 is a block/flow diagram of a method of adapting an MNDR model to the operational conditions of a device, in accordance with an embodiment of the present invention.

Referring now to FIG. 5, a method for performing adaptation based on unlabeled data that is collected during operation. Block 502 gathers the data from a data source that has been deployed. The data may be unlabeled as to its signal quality characteristics, as such information may not be available in a realistic deployment. A limited number of labeled samples may also be available from the meta-testing phase, relating to the specific data source being used. The unlabeled time series segments are encoded at block 504 using the encoder 202 from the meta-training. The latent representation is then decoded in block 506 using the decoder 220 that was generated during meta-testing for this type of data source.

Block 508 uses a multi-part loss function to evaluate the decoded signals. Block 510 uses the calculated loss to update parameters of the MNDR model 106, which may update neural network weights in the encoder 202, the policy network 210, and/or the decoder 220. Updating the parameters may be performed using a stochastic gradient descent to reduce the loss.

Block 512 determines whether a stopping condition is satisfied. For example, if all of the unlabeled training data from the new data source has been used for training, then block 514 may complete the adaptation. If block 512 determines that the stopping condition has not been satisfied, then processing may return to block 504 to encode a next unlabeled time series segment. Exemplary stopping conditions may include, e.g., reaching a maximum number of training epochs or reaching a predetermined lower threshold for the value of the training loss function.

When calculating the loss in block 508, different criteria may be used for labeled and unlabeled samples. For labeled samples, for example those used during the meta-testing phase, the same triplet loss as in block 408 above may be used. Labeled samples may be used during testing to find the nearest sample for each test input to determine which class that test input belongs to. Thus, the labeled samples from meta-testing may be imported as class references.

For unlabeled samples, the triplet loss may be based on the distance in the raw input space. For the unlabeled samples, a positive sample may be randomly selected from the k-nearest neighbor of each anchor sample and a negative sample may be randomly selected from outside the k-nearest neighbor of each anchor sample. Thus block 508 may also perform clustering of the unlabeled samples according to any appropriate clustering technique.

The discrepancy loss between class centers of labeled samples and cluster centroids (prototypes) of unlabeled samples may be determined as:

$$\sum_k \min_c \|p_k - \mu_c\| + \sum_c \min_k \|\mu_c - p_k\|$$

where $p_k$ represents the $k^{th}$ prototype and where $\mu_c$ is the center of all samples belonging to class c.

After adaptation is performed, additional testing may be done to confirm that the adapted MNDR model 106 operates correctly on the labeled data. Labeled data samples may be encoded by the encoder 202 and classification may be performed to confirm that the output classifications match the provided labels. Classification may be performed on the output of the decoder 220.

Figure 6:
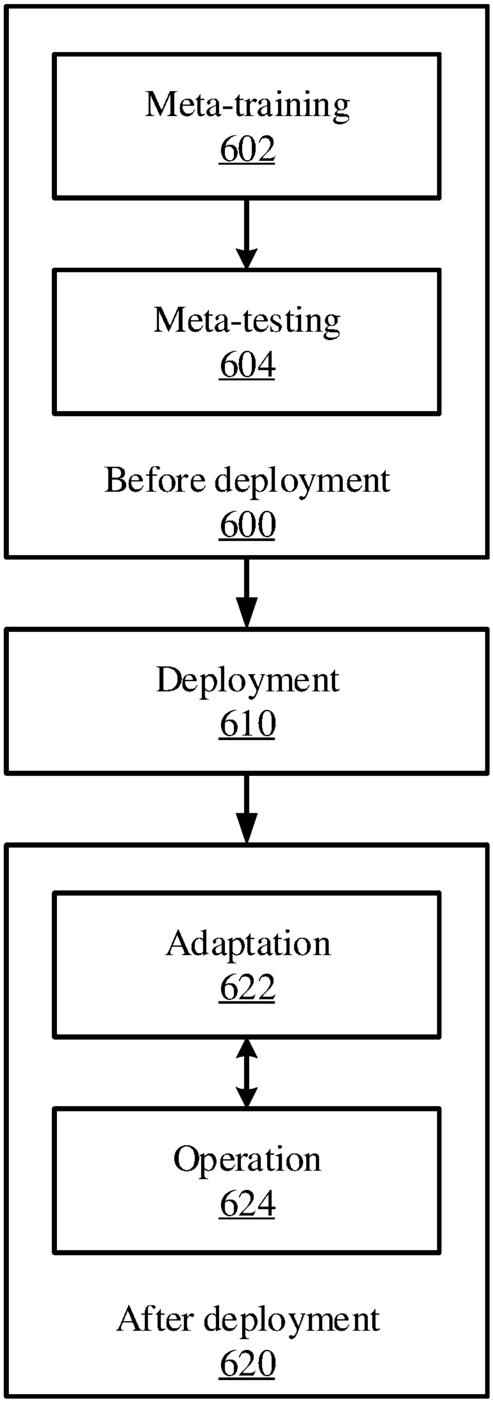
FIG. 6 is a block/flow diagram of training, deploying, and adapting an MNDR model, in accordance with an embodiment of the present invention.

Referring now to FIG. 6, a diagram illustrates different phases of training in the context of deployment of a given device. Certain tasks take place before deployment in block 600. These tasks include meta-training 602 using a relatively large set of labeled training data samples, which may be used to train a shared encoder 202 of the MNDR model 106. Meta-testing 604 may also be performed before deployment, using a relatively small set of labeled training data samples that relate to a specific type of hardware or configuration. The meta-testing 604 may be used to generate a decoder 220 that is specific to the hardware or configuration.

Deployment 610 may include installing an instance of the hardware or configuration in a real-world environment or network. For example, if meta-testing 604 is performed to generate a decoder 220 for a particular model of optical transceiver, deployment 610 may include building an optical network that includes the optical transceiver. In another example, where the meta-testing 604 is used to generate a decoder 220 for a particular configuration of existing hardware, then deployment 610 may include reconfiguring an existing network to implement the particular configuration.

Further tasks may be performed after deployment in block 620. Using unlabeled time series data from operation 624, adaptation 622 may be performed to further refine the parameters of the MNDR model 106. This unlabeled data may be relatively abundant, as it may be generated continuously by the network hardware as it is used. Adaptation 622 thereby adapts the model to the actual conditions of the network.

Figure 7:
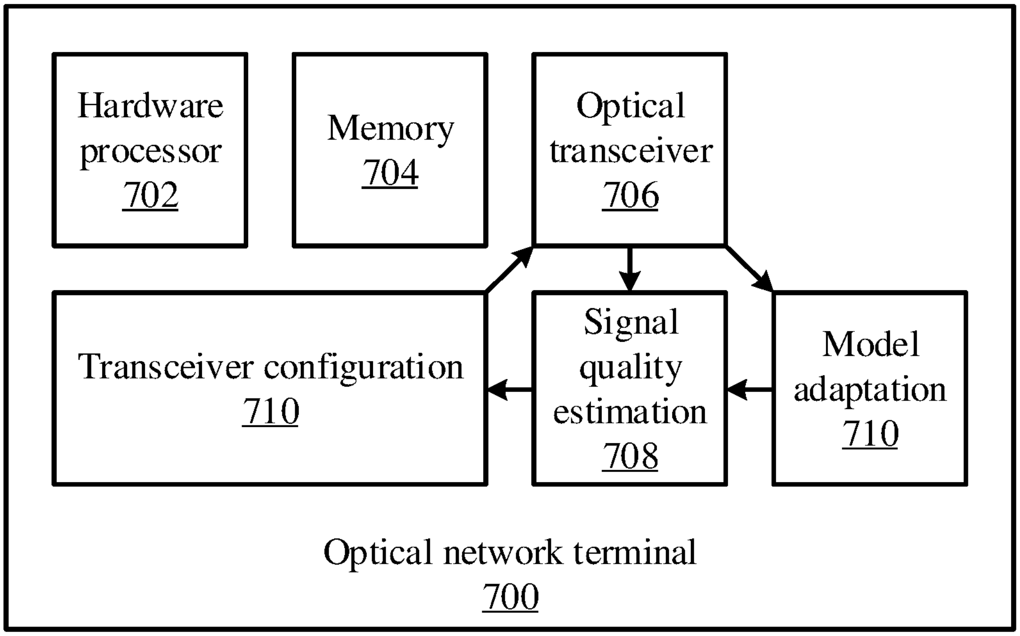
FIG. 7 is a block diagram of an optical network terminal that performs MNDR model adaptation for signal quality estimation, responsive to operational conditions, in accordance with an embodiment of the present invention.

Referring now to FIG. 7, a diagram of an optical network terminal (ONT) 700 is shown. The ONT 700 may include a hardware processor 702 and a memory 704. An optical transceiver 706 interfaces with an optical medium, such as an optical fiber cable, to send and receive information on the medium.

Signal quality estimation 708 is performed based on signal information that is provided by the optical transceiver 706. As described above, signal quality estimation 708 may use a trained and adapted MNDR model 106 to estimate the signal quality. The MNDR model 106 may be adapted using unlabeled information provided by the optical transceiver 706 at model adaptation 710.

Based on the estimated signal quality, transceiver configuration 710 may be changed to improve performance of the ONT 700. The configuration may be changed manually, by a system administrator, or may be changed automatically responsive to changing network quality conditions.

Figure 8:
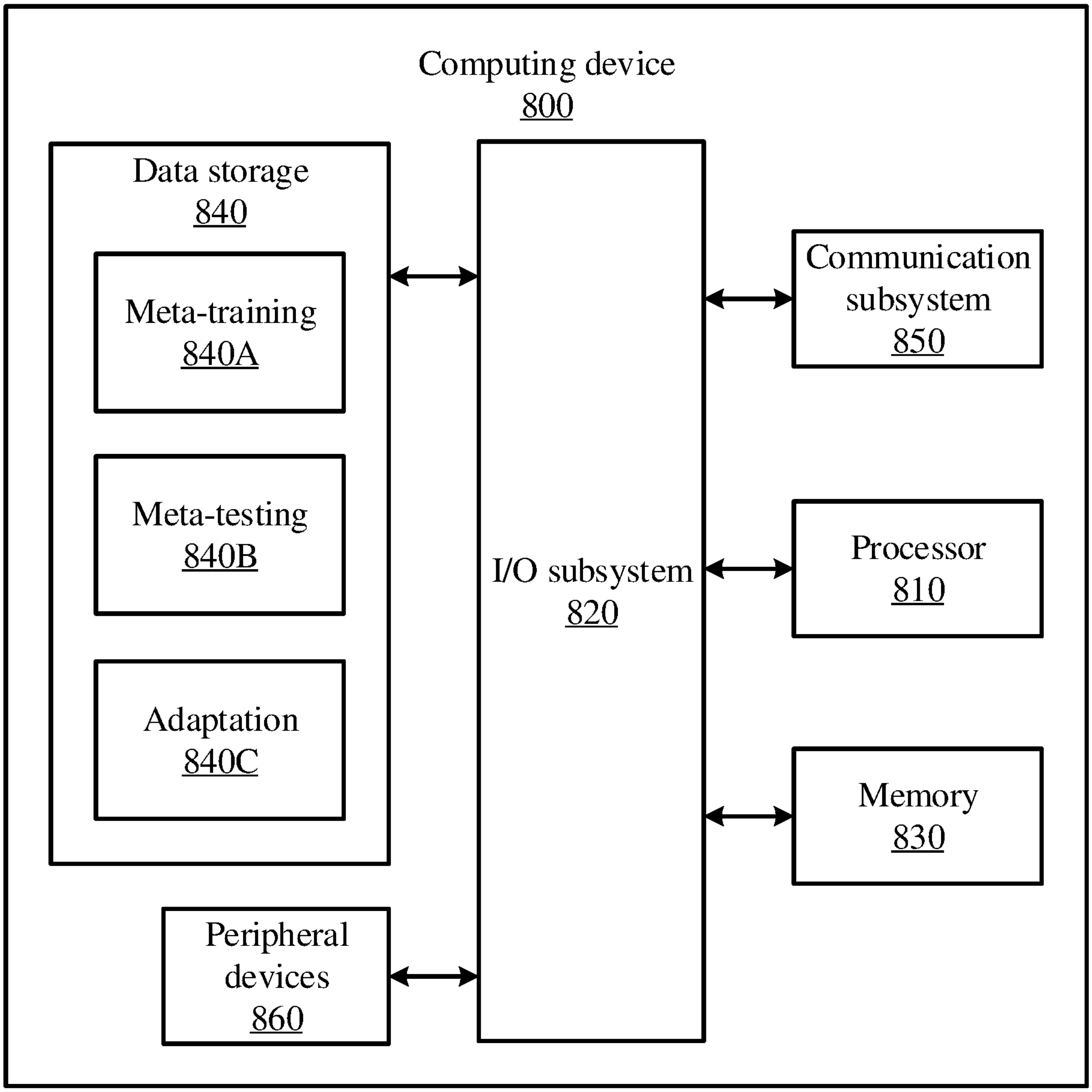
FIG. 8 is a block diagram of a processing system that includes program code to perform meta-training, meta-testing, and/or adaptation of an MNDR model, in accordance with an embodiment of the present invention.

Referring now to FIG. 8, an exemplary computing device 800 is shown, in accordance with an embodiment of the present invention. The computing device 800 is configured to perform classifier enhancement.

The computing device 800 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 800 may be embodied as one or more compute sleds, memory sleds, or other racks, sleds, computing chassis, or other components of a physically disaggregated computing device.

As shown in FIG. 8, the computing device 800 illustratively includes the processor 810, an input/output subsystem 820, a memory 830, a data storage device 840, and a communication subsystem 850, and/or other components and devices commonly found in a server or similar computing device. The computing device 800 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 830, or portions thereof, may be incorporated in the processor 810 in some embodiments.

The processor 810 may be embodied as any type of processor capable of performing the functions described herein. The processor 810 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 830 may be embodied as any type of volatile or non-volatile memory or data storage capable of performing the functions described herein. In operation, the memory 830 may store various data and software used during operation of the computing device 800, such as operating systems, applications, programs, libraries, and drivers. The memory 830 is communicatively coupled to the processor 810 via the I/O subsystem 820, which may be embodied as circuitry and/or components to facilitate input/output operations with the processor 810, the memory 830, and other components of the computing device 800. For example, the I/O subsystem 820 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 820 may form a portion of a system-on-a-chip (SOC) and be incorporated, along with the processor 810, the memory 830, and other components of the computing device 800, on a single integrated circuit chip.

The data storage device 840 may be embodied as any type of device or devices configured for short-term or long-term storage of data such as, for example, memory devices and circuits, memory cards, hard disk drives, solid state drives, or other data storage devices. The data storage device 840 can store program code 840A for performing meta-training using labeled training data for a set of devices, 840B for performing meta-testing to generate a decoder for a new device, and/or 840C for performing adaptation of the model using unlabeled data collected in operation. The communication subsystem 850 of the computing device 800 may be embodied as any network interface controller or other communication circuit, device, or collection thereof, capable of enabling communications between the computing device 800 and other remote devices over a network. The communication subsystem 850 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 800 may also include one or more peripheral devices 860. The peripheral devices 860 may include any number of additional input/output devices, interface devices, and/or other peripheral devices. For example, in some embodiments, the peripheral devices 860 may include a display, touch screen, graphics circuitry, keyboard, mouse, speaker system, microphone, network interface, and/or other input/output devices, interface devices, and/or peripheral devices.

Of course, the computing device 800 may also include other elements (not shown), as readily contemplated by one of skill in the art, as well as omit certain elements. For example, various other sensors, input devices, and/or output devices can be included in computing device 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 800 are readily contemplated by one of ordinary skill in the art given the teachings of the present invention provided herein.

Figure 9:
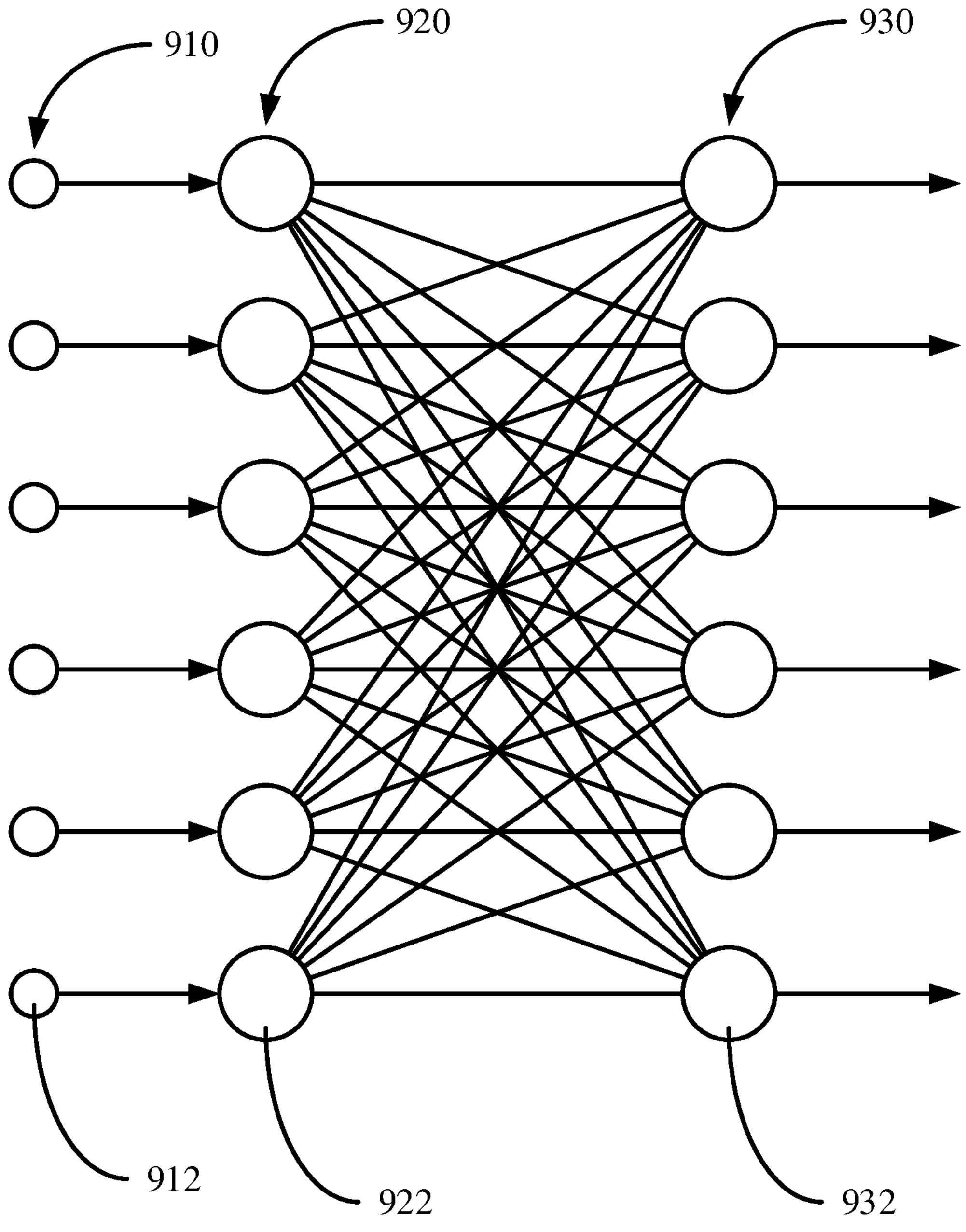
FIG. 9 is a diagram of a neural network architecture that may be used to implement part of an MNDR model, in accordance with an embodiment of the present invention.
Figure 10:
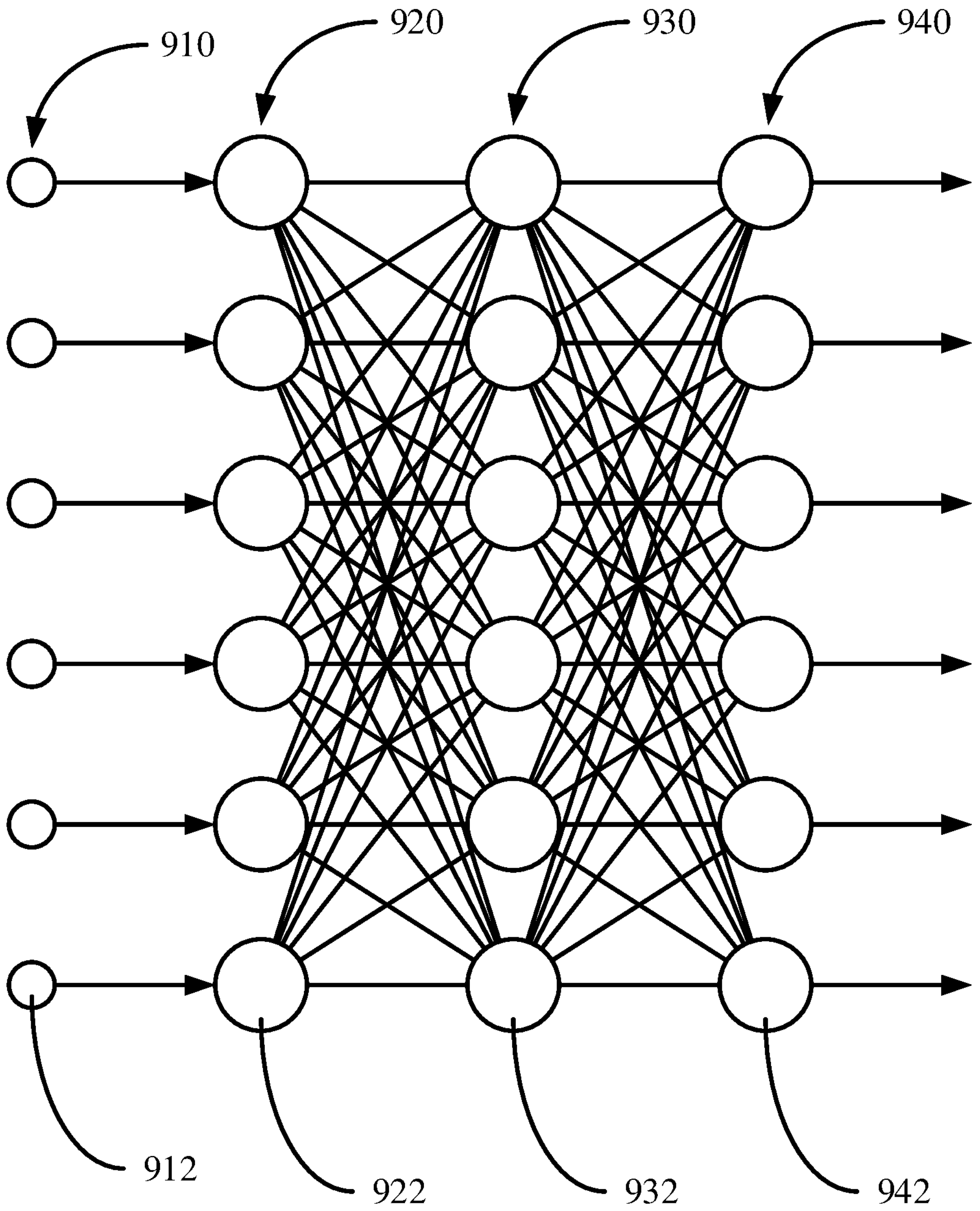
FIG. 10 is a diagram of a deep neural network architecture that may be used to implement part of an MNDR model, in accordance with an embodiment of the present invention.

Referring now to FIGS. 9 and 10, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 920 of source nodes 922, and a single computation layer 930 having one or more computation nodes 932 that also act as output nodes, where there is a single computation node 932 for each possible category into which the input example could be classified. An input layer 920 can have a number of source nodes 922 equal to the number of data values 912 in the input data 910. The data values 912 in the input data 910 can be represented as a column vector. Each computation node 932 in the computation layer 930 generates a linear combination of weighted values from the input data 910 fed into input nodes 920, and applies a non-linear activation function that is differentiable to the sum. The exemplary simple neural network can perform classification on linearly separable examples (e.g., patterns).

A deep neural network, such as a multilayer perceptron, can have an input layer 920 of source nodes 922, one or more computation layer(s) 930 having one or more computation nodes 932, and an output layer 940, where there is a single output node 942 for each possible category into which the input example could be classified. An input layer 920 can have a number of source nodes 922 equal to the number of data values 912 in the input data 910. The computation nodes 932 in the computation layer(s) 930 can also be referred to as hidden layers, because they are between the source nodes 922 and output node(s) 942 and are not directly observed. Each node 932, 942 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 932 in the one or more computation (hidden) layer(s) 930 perform a nonlinear transformation on the input data 912 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of training a model, comprising:

collecting unlabeled training data during operation of a device; and adapting a model to operational conditions of the device using the unlabeled training data, wherein the model includes a shared encoder that is trained on labeled training data from a plurality of devices and further includes a device-specific decoder that is trained on labeled training data corresponding to the device, including:

encoding the unlabeled training data using the encoder to generate an encoded representation;

decoding the encoded representation using the decoder to generate a decoded representation; and modifying parameters of the decoder responsive to a loss function based on the decoded representation, wherein the loss function includes a discrepancy loss between class centers of labeled samples and prototypes of unlabeled samples:

$$\sum_k \min_c \|p_k - \mu_c\| + \sum_c \min_k \|\mu_c - p_k\|$$

where $p_k$ represents a $k^{th}$ prototype of a class and where $\mu_c$ is a center of all samples belonging to class c;

classifying the decoded representation to determine signal quality;

changing a configuration of an optical network terminal (ONT) responsive to the determined signal quality; and
transmitting data using the ONT with the changed configuration.

2. The method of claim 1, wherein the device is an optical network transceiver and the unlabeled training data includes a measured signal output.

3. The method of claim 1, wherein the shared encoder includes a first layer of long-short term memory (LSTM) cells and one or more subsequent layers of multilayer perceptron (MLP) cells.

4. The method of claim 3, wherein the model further includes a policy network that sets active connections between cells of the encoder in accordance with the device-specific decoder.

5. The method of claim 1, wherein the labeled samples include samples used to train the device-specific decoder.

6. A communications system, comprising:
a transceiver configured to collect unlabeled training data during operation;
a hardware processor; and
a memory configured to store program code which, when executed by the hardware processor, causes the hardware processor to:
adapt a model to operational conditions of the transceiver using the unlabeled training data, wherein the model includes a shared encoder that is trained on labeled training data from a plurality of devices and further includes a device-specific decoder that is trained on labeled training data corresponding to the device, including:
encoding of the unlabeled training data using the encoder to generate an encoded representation;
decoding of the encoded representation using the decoder to generate a decoded representation; and
modification of parameters of the decoder responsive to a loss function based on the decoded representation, wherein the loss function includes a discrepancy loss between class centers of labeled samples and prototypes of unlabeled samples:

$$\sum_k \min_c \|p_k - \mu_c\| + \sum_c \min_k \|\mu_c - p_k\|$$

where $p_k$ represents a $k^{th}$ prototype of a class and where $\mu_c$ is a center of all samples belonging to class c;
classify the decoded representation to determine signal quality;
change a configuration of an optical network terminal (ONT) responsive to the determined signal quality; and
transmit data using the ONT with the changed configuration.

7. The system of claim 6, wherein the transceiver is an optical network transceiver and the unlabeled training data includes a measured signal output.

8. The system of claim 6, wherein the shared encoder includes a first layer of long-short term memory (LSTM) cells and one or more subsequent layers of multilayer perceptron (MLP) cells.

9. The system of claim 8, wherein the model further includes a policy network that sets active connections between cells of the encoder in accordance with the device-specific decoder.

10. The system of claim 6, wherein the labeled samples include samples used to train the device-specific decoder.

* * * * *